United States Patent [19]
Artt

[11] Patent Number: 5,439,351
[45] Date of Patent: Aug. 8, 1995

[54] HEAT PIPES

[75] Inventor: David W. Artt, Belfast, Northern Ireland

[73] Assignee: Rolls-Royce, plc, Derby, England

[21] Appl. No.: 917,270

[22] Filed: Jun. 15, 1978

[30] Foreign Application Priority Data

Jul. 22, 1977 [GB] United Kingdom ............ 30809

[51] Int. Cl.6 ............................................. F01D 5/18
[52] U.S. Cl. .................................. 416/95; 165/104.26; 415/114; 416/96 R
[58] Field of Search ............. 165/105, 104.21–104.27; 415/114, 115, 116, 117; 416/90 R, 95, 96 R, 96 A, 97 R, 232, 233, 236 R

[56] References Cited

U.S. PATENT DOCUMENTS

| | | | |
|---|---|---|---|
| 3,287,906 | 11/1966 | McCormick | 416/95 |
| 4,012,770 | 3/1977 | Pravda et al. | 165/105 |
| 4,116,266 | 9/1978 | Sawata et al. | 165/105 |

Primary Examiner—Stephen C. Bentley
Attorney, Agent, or Firm—Cushman, Darby & Cushman

[57] ABSTRACT

A heat pipe, which may for instance be in the form of an aerofoil blade for a gas turbine engine, is provided with capillary means which is in two different forms. One form is constituted by a porous material and the other constituted by grooves formed in the surface of the internal wall of the heat pipe.

4 Claims, 1 Drawing Sheet

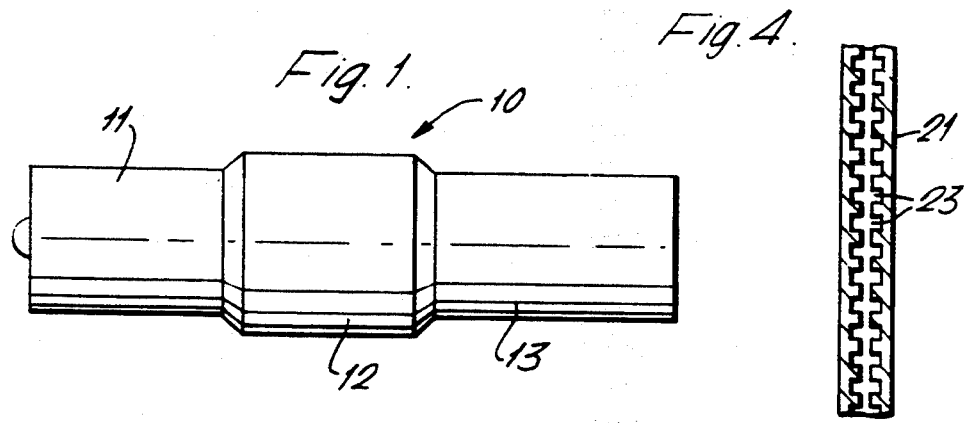
Fig. 1.
Fig. 4.
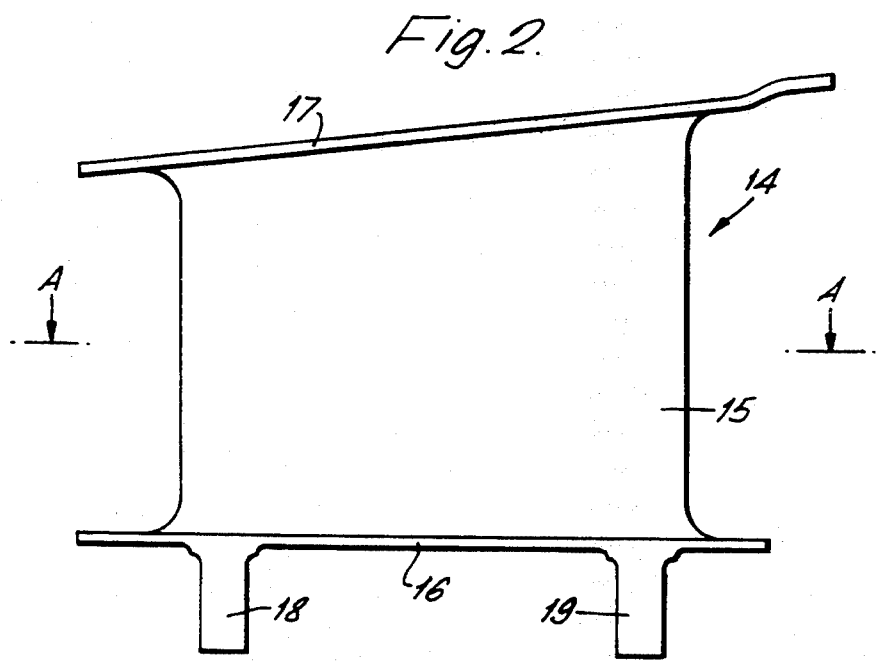
Fig. 2.
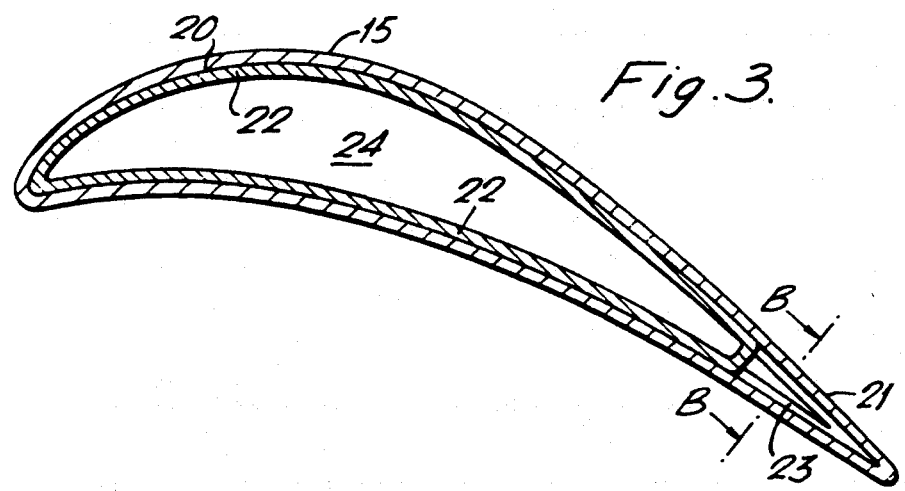
Fig. 3.

HEAT PIPES

This invention relates to heat pipes.

A heat pipe is a heat transfer device comprising a sealed container which encloses both a condensable vapour and capillary means capable of causing the transport of the condensed vapour from a cooler area of the container to a hotter area, the condensable vapour being transported from the hotter area to the cooler area by the vapour pressure gradient between the two areas, the vapour being condensed in the cooler area.

The capillary means of heat pipes generally comprises a layer of a porous material such as porous metal or wire mesh, a porous ceramic or sintered glass which is positioned adjacent the internal wall of the container. If the heat pipe is of complex configuration, it is a difficult task during its construction to ensure that the capillary means is positioned adjacent the container wall. Whilst this is not crucial so far as cooler areas of the heat pipe are concerned, it is extremely important to ensure that the capillary means are positioned adjacent the container wall in hotter regions of the heat pipe. Thus if the capillary means are not so positioned, condensed vapour cannot be effectively transported to the hot container wall. The inevitable result of this is that vapourisation occurs before the condensed vapour reaches the regions of highest temperature, thereby lowering the efficiency of the heat pipe and consequently impairing its isothermal characteristics.

It has been proposed in British Patent No. 1,118,468 to provide the internal surface of the sealed container with grooves which constitute capillary passages, thereby ensuring that the condensed vapour is transported adjacent to the heat pipe wall. However, such grooves may be difficult and expensive to produce with certain heat pipe shapes such for instance as the aerofoil blade shape of a gas turbine engine.

For this reason, such aerofoil blades have only been described with a separate layer of capillary means as is exemplified in British Patent No. 1,080,860. Whilst such an arrangement is effective so far as a large proportion of the internal surface of the blade is concerned, difficulty is encountered in ensuring that the capillary means extends into the trailing edge region of the blade. It is unfortunate that this region is exposed to higher heat fluxes than most of the remaining regions of the blade and that it is of necessity rather thin. Consequently there is a great danger of this blade region overheating with resultant damage occurring.

It is an object of the present invention to provide a heat pipe structure which is relatively cheap and easy to produce but which substantially avoids some of the disadvantages of heat pipes provided with capillary means in the form of a discrete layer of porous material.

According to the present invention, a heat pipe comprises a sealed container enclosing a material capable of vapourisation and condensation within the temperature limits at which the heat pipe is adapted to operate, and capillary means capable of causing the transport of the condensed vapour from a cooler area to a hotter area of the container. The condensed vapour is transported from the hotter area to the cooler area by the vapour pressure gradient between the two areas, the vapour being condensed in the cooler area. At least one portion of the capillary means is in the form of a porous material positioned adjacent to and in substantial contact with the internal wall of the container and the remainder of the capillary means is in the form of grooves formed directly in the internal wall of the container, the grooves being connected in flow series and an abutting nonsuperposed relationship with the porous material.

The material capable of vapourisation and condensation is preferably sodium.

This is because sodium has:

a) a high surface tension to provide satisfactory capillary pumping,
b) good wetting characteristics with the capillary means again as a result of its high surface tension,
c) low viscosity to aid pumping of the liquid sodium along the capillary means,
d) high latent heat of vapourisation to aid heat transfer,
e) high thermal conductivity to aid heat transfer between the liquid sodium, the heat pipe wall and the capillary means,
f) high vapour density to reduce flow resistance,
g) chemical stability.

The at least one capillary means portion in the form of a porous material may be formed from stainless steel mesh.

The heat pipe may be in the form of an aerofoil blade for a gas turbine engine, the capillary means in the form of grooves being located at least in the trailing edge region of the blade.

The invention will now be described by way of example with reference to the accompanying drawings in which:

FIG. 1 is a side view of a gas turbine engine provided with nozzle guide vanes in the form of heat pipes and which are in accordance with the present invention, FIG. 2 is a side view of one of the nozzle guide vanes of the gas turbine engine shown in FIG. 1, FIG. 3 is a view on line A—A of the nozzle guide vane shown in FIG. 3, and FIG. 4 is a view on line B—B of the nozzle guide vane shown in FIG. 3.

With reference to FIG. 1, a gas turbine engine generally shown at 10 includes a compressor 11, combustion equipment 12 and a turbine 13. The gas turbine engine 10 operates in the conventional manner, that is, air compressed by the compressor 11 is mixed with fuel and combusted in the combustion equipment 12. The resultant hot gases expand through the turbine 13 to atmosphere, thereby driving the turbine 13 which in turn drives the compressor 11. The hot gases from the combustion equipment 12 are directed into the turbine 13 by an annular array of stationary nozzle guide vanes, one of which 14 can be seen in FIG. 2.

The nozzle guide vane 14 consists of an aerofoil cross-section portion 15 which is provided with radially inner and outer shrouds 16 and 17 (with respect to the longitudinal axis of the gas turbine engine 10). The radially inner shroud 16 is provided with two bosses 18 and 19 by means of which it is retained in position in the turbine 13.

The aerofoil portion 15 is hollow as can be more clearly seen in FIG. 3. The whole of its internal wall 20, with the exception of that portion which is in the region of the trailing edge 21, has a stainless steel mesh 22 spot welded to it. The trailing edge 21 portion of the internal wall 20 is however, provided with a series of grooves 23 which are actually formed in the wall 20. The grooves 23, which can be more easily seen in FIG. 4, extend in a generally chordwise direction and are adapted to abut the stainless steel mesh 22.

The hollow interior 24 of the aerofoil portion 15 is a vacuum and contains a small amount of sodium. Consequently the aerofoil portion 15 is in the form of a heat pipe.

In operation, hot gases issued from the combustion equipment 12 impinge upon the annular array of nozzle guide vanes 14 in such a manner that each guide vane 14 has regions on its aerofoil portion which are of differing temperatures. The heating up of the nozzle guide vanes 14 results in the melting and subsequent vapourisation of the sodium contained within them. Sodium vapourised in the hotter regions of the nozzle guide vanes 14 is transported by vapour pressure differences to the cooler regions where it condenses. Thus the heat required to vapourise the sodium is extracted from those hotter regions and is utilised in heating up the cooler regions upon the condensation in those cooler regions of the sodium vapour. After condensation, the liquid sodium is pumped by capillary action through the stainless steel mesh 22 and grooves 23 back to the hotter regions whereupon the cycle is repeated. Thus by the constant vapourisation and condensation of the sodium, each of the nozzle guide vanes 14 assumes a substantially even temperature distribution i.e. each becomes substantially isothermal.

The stainless steel mesh 22 and the grooves 23 act in conjunction to provide a substantially continuous capillary surface over the whole of the interior of aerofoil portion 15. Since the grooves 23 are connected in flow series with and abut but are in nonsuperposed relationship with the stainless steel mesh 22 as shown in FIG. 3, a flow of liquid sodium is sustained between the trailing edge 21 and the rest of the aerofoil portion 15. Consequently the trailing edge 21 and the rest of the aerofoil portion 15 are maintained substantially isothermal.

Since the stainless steel mesh 22 only extends over the readily accessible regions of the internal wall 20 of the aerofoil portion 15, it is comparatively simple to ensure that the mesh 22 is in virtually complete contact with the wall 20. The provision of grooves 23 in the trailing edge 21 which abut but are in nonsuperposed relationship with the stainless steel mesh 22 ensures that capillary means extend as far into the trailing edge 21 as possible whilst maintaining contact between the internal wall 20 and the liquid sodium. Moreover by providing grooves 23 which extend in substantially chordwise direction, some degree of directional cooling of the trailing edge 21 is achieved.

Thus the use of a stainless steel mesh 22 and grooves 23 in combination achieves the same results as for instance would be achieved by the provision of grooves over the whole of the internal wall 20 i.e. contact between the whole of the wall 20 and the liquid sodium. This is achieved by the present invention however without incurring the technical difficulties and expense which would be associated with the provision of total groove coverage over the internal wall 20.

Although the present invention has been described with reference to a heat pipe which is in the form of a nozzle guide vane for a gas turbine engine, it will be appreciated that it is applicable to any heat pipe which is of such configuration that the use of either a porous material or grooves alone is not satisfactory from the point of view of cost and/or efficiency.

Moreover the invention is not restricted to heat pipes provided with stainless steel mesh capillary means and sodium vapour. Thus for instance other porous materials such as porous ceramics could be readily utilised as could other condensable vapours such as those of lithium and potassium.

I claim:

1. An aerofoil blade for a gas turbine engine, said aerofoil blade having a leading edge region and a trailing edge region and including a heat pipe comprising a sealed container, a material capable of vapourisation and condensation within the temperature limits at which said heat pipe is adapted to operate, and capillary means, said material and said capillary means being enclosed within said sealed container, said capillary means being capable of causing transport of the condensed vapour from a cooler to a hotter region of the container, the condensed vapour being transported from the hotter area to the cooler area by the vapour pressure gradient between the two areas, said vapour being condensed in the cooler area, at least one portion of said capillary means being in the form of a porous material positioned adjacent to and in substantial contact with the internal wall of said container and the remainder portion of said capillary means being in the form of grooves formed directly in the internal wall of said container at least in the trailing edge region of said aerofoil blade, said at least one portion of said porous material of said capillary means and said remainder portion of grooves of said capillary means being connected in flow series and in an abutting nonsuperposed relationship.

2. A heat pipe as claimed in claim 1 wherein said material capable of vapourisation and condensation is sodium.

3. A heat pipe as claimed in claim 1 wherein said at least one capillary means portion in the form of a porous material is formed from a stainless steel mesh.

4. A heat pipe as claimed in claim 1 in which the grooves in the trailing edge region of said blade extend in a chordwise direction of the blade.

* * * * *